F. SIDNEY TOWNSEND, OF SOUTH SEAVILLE, NEW JERSEY.

Letters Patent No. 86,259, dated January 26, 1869.

IMPROVED COMPOUND FOR DESTROYING VERMIN ON PLANTS AND TREES.

The Schedule referred to in these Letters Patent and making part of the same.

*To all whom it may concern:*

Be it known that I, F. SIDNEY TOWNSEND, of South Seaville, in the county of Cape May, and State of New Jersey, have invented a new and improved Compound for Destroying Worms and Insects; and I do hereby declare that the following is a full, clear, and exact description thereof, which will enable others skilled in the art to make and use the same.

The object of this invention is to provide means for protecting fruit-trees and other trees and shrubs from damage and destruction from worms and insects; and It consists in forming a compound or composition of the ingredients hereinafter named, for application to trees and garden-shrubbery, but which is more particularly designed for the protection of peach-trees and other fruit-trees.

It is well known that the depredations of the "grub," so destructive to fruit-trees, (peach-trees especially,) are confined principally to the portion of the body of the tree which is immediately above and below the surface of the ground. The grub or worm usually burrows in the ground, and makes an entrance through the bark beneath the surface, and bores upward under the bark, thus interfering materially with the circulation of the sap, and frequently destroying the tree altogether.

I have ascertained that a compound of sixteen parts of slaked lime, mixed with water until it is of the consistency of thick cream, sixteen parts of kerosene, and one part of water, thoroughly mixed together, is a perfect protection against worms, grubs, or insects, when applied to the tree.

It may be applied to any and every part of the tree, if desired, but for protection against the destructive grub, I remove the earth for two or three inches in depth around the body of the tree, and apply the composition as a belt around the tree, both below and above the surface.

When the application is thus made, the channel made around the tree may be filled, or the surface of the ground restored to a level, as before.

Having thus described my invention,

What I claim as new, and desire to secure by Letters Patent, is—

A composition for the protection of fruit and other trees and shrubs from damage by worms, grubs, and insects, formed of the ingredients mentioned, and in about the proportion named.

The above specification of my invention signed by me, this 3d day of December, 1868.

F. SIDNEY TOWNSEND.

Witnesses:
JOHN L. SMITH,
THOMPSON E. VAN GILDER.